May 23, 1967  P. J. GOOD  3,320,865
SELF-DEVELOPING PHOTOGRAPHIC CAMERA
Filed June 30, 1964  2 Sheets-Sheet 1

May 23, 1967  P. J. GOOD  3,320,865

SELF-DEVELOPING PHOTOGRAPHIC CAMERA

Filed June 30, 1964  2 Sheets-Sheet 2

United States Patent Office 3,320,865
Patented May 23, 1967

3,320,865
SELF-DEVELOPING PHOTOGRAPHIC CAMERA
Paul J. Good, Springwater, N.Y., assignor, by mesne assignments, to Minnesota Mining and Manufacturing Company, St. Paul, Minn., a corporation of Delaware
Filed June 30, 1964, Ser. No. 379,159
6 Claims. (Cl. 95—13)

This invention relates to a photographic camera, and more particularly to a camera having provision for quickly processing the image to make a usable print, such cameras frequently being known in the art as instant cameras or rapid picture cameras or rapid access picture cameras.

An object of the invention is the provision of a generally improved and more satisfactory camera of this type.

Another object is the provision of a camera having simplified and improved means for developing or otherwise processing the negative material on which the exposure is made, to produce a usable positive print.

Still another object is the provision of a camera which is particularly simple, compact, and easy to use, being well adapted to amateur use as a hand camera.

A further object is the provision of an instant camera in which the developing fluid is supplied in an improved and more economical manner, as compared with the prior art, resulting in greater reliability of operation as well as less expense.

These and other desirable objects may be attained in the manner disclosed as an illustrative embodiment of the invention in the following description and in the accompanying drawings forming a part hereof, in which.

As will be apparent to those skilled in the art as the description proceeds, the camera of the present invention operates in accordance with the known principles of the diffusion transfer process, whether it be silver diffusion transfer or dye diffusion transfer. The camera may take various forms. One form, preferred at present, is illustrated in FIGS. 1–5 as an example of the invention.

Figure 1:
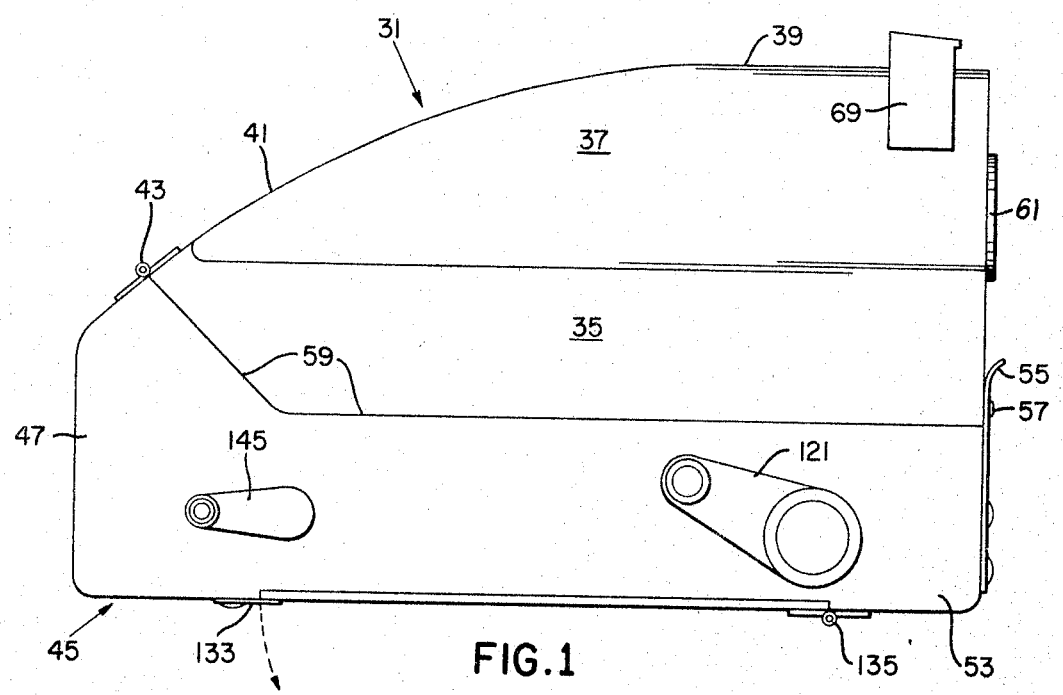
FIG. 1 is a side elevation of a camera according to a preferred form of the present invention.
Figure 2:
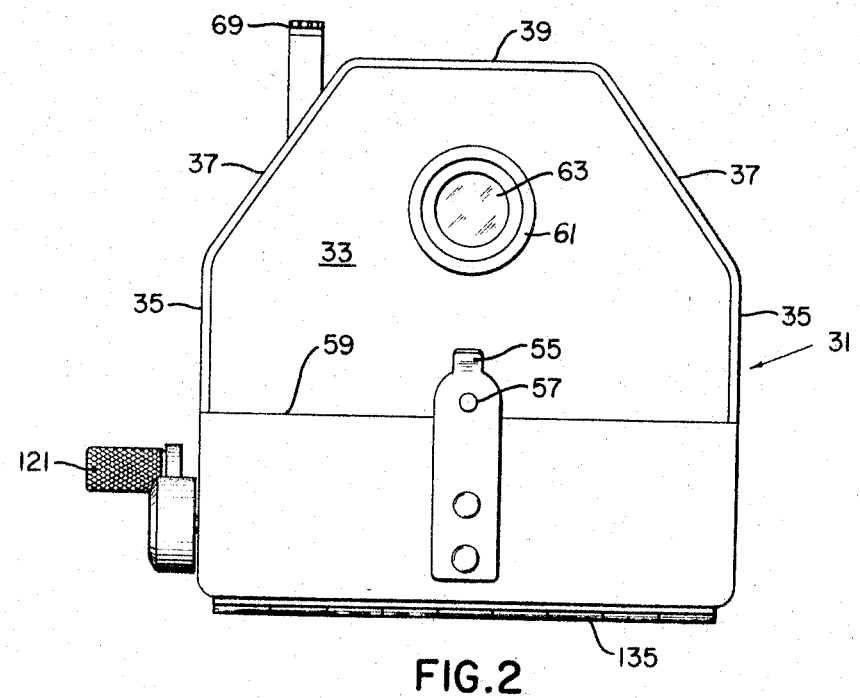
FIG. 2 is a front view of the same.
Figure 3:
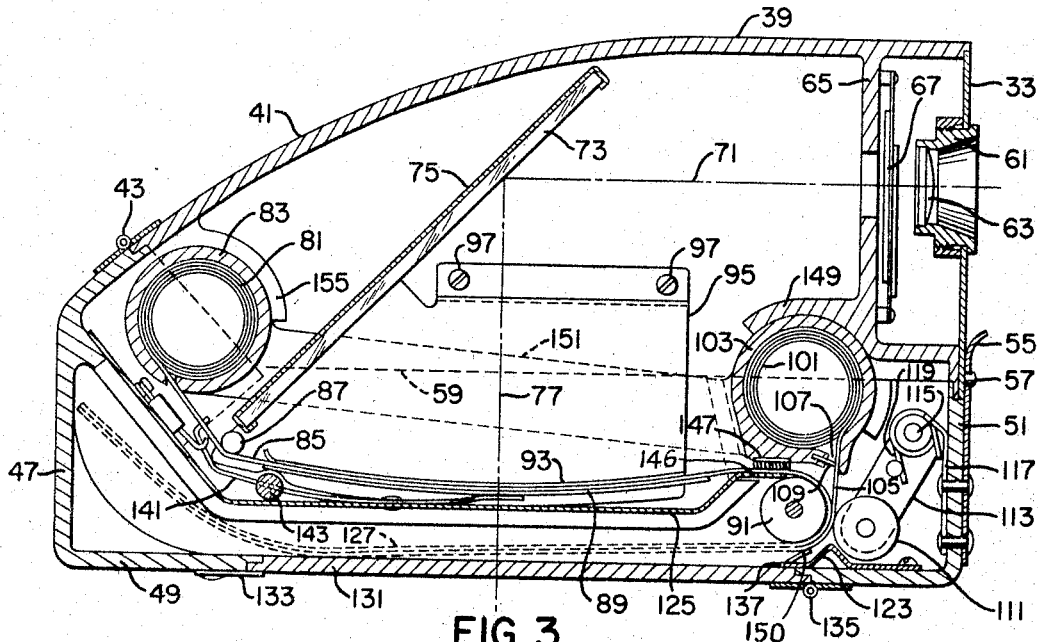
FIG. 3 is a longitudinal section taken centrally through the same.

The camera has a main body portion indicated in general at 31, having a front wall 33, and side wall portions 35 which are parallel to each other and at right angles to the front wall 33. Above the parallel side wall portions 35 there are inclined side wall portions 37 which incline inwardly toward each other in an upward direction, as best seen in the front view, FIG. 2, and a top wall 39 which is flat at the forward part of the camera, gradually curving downwardly in the rear part as indicated at 41, best seen in FIGS. 1 and 3. A lower section of the camera is hinged to the main body section 31 by a hinge 43 located on the sloping top wall section 41, as seen in FIGS. 1 and 3. This lower hinged section of the body is indicated in general at 45 and has a rear wall portion 47, bottom wall poraion 49, front wall portion 51, and side wall portions 53. Because of the hinge 43, the lower body section 45 may be swung downwardly relative to the upper body section 31, to obtain easy access to the interior of both sections. When they are swung together to closed position, they are retained in closed position by a spring catch or latch 55 on the lower section, engaging over a pin or protuberance 57 near the lower edge of the upper section. The parts are so arranged that during the closing movement, the latch 55 will be displaced by and will snap over the retaining part 57. If the upper edge of the latch 55 is pulled forwardly against its resilient force, it can be freed from the retainer 57 so that the body of the camera may be opened. When the body is closed, the upper edges of the lower section 45 mate with the lower edges of the upper body section 31 in a light tight manner, having angles or rabbets of conventional form for this purpose, although for the sake of simplicity of the drawings, the parting line between the upper and lower body sections is shown in the drawings as a simple single parting line 59.

In the front wall 33 there is a lens mount 61 containing a lens 63. Mounted on a partition 65 somewhat to the rear of the lens 63 is a shutter structure 67, the shutter being operated by a finger piece 69 which projects from the casing. The lens mount, lens, and shutter may all be of conventional construction, the details not being important for purposes of the present invention. The optical axis passing through the lens and shutter is indicated schematically by the line 71.

Located on this optical axis in intersecting relation thereto is a reflecting element such as the mirror 73, mounted in the metallic holder 75, the reflecting element serving to reflect the light rays downwardly along the axis 77, so that they fall on the film at the image surface, commonly referred to as the focal plane of a camera, although in the present instance the film is preferably not in the usual flat plane but is curved to some extent, to help to compensate for the usual "curvature of field" effect produced by the lens.

The negative material is drawn out approximately tangentially from a roll 81 of sensitized material, contained within a hollow cylindrical container or capsule 83, coming out through an approximately tangential slot in the wall of the cylinder. Thence the sensitized material, indicated at 85, passes beneath a guide roller 87 extending across the camera near the bottom edge of the mirror 73. Thence it extends forwardly over the top of a curved backing plate 89, having an upper surface which is slightly concave in a longitudinal direction, and passes downwardly over a transverse roller 91. The film 85 is held down against the curved backing plate 89 by means of lateral flanges 93 which extend inwardly from opposite sides of the camera body over the marginal edges of the sensitized material 85, thereby keeping it in the desired curved shape, substantially tight against the curved backing plate 89, throughout the exposure area. These lateral flanges 93 (which cover only the margins of the sensitized material, as above mentioned) extend laterally inwardly from and are integral with bracket plates 95 of metal, one on the inner face of each side wall of the main camera body section 31, being fastened thereto by any suitable means such as the screws 97. The metal mounting plate 75 which holds the mirror 73 may be secured to or integral with the bracket plates 95. When the camera is opened up by swinging the upper and lower sections of the body away from each other on the hinge 43, the mirror 73, the bracket plates 95, the lateral flanges 93 on the bracket plates, and the roller 87 which is also mounted on the bracket plates, all stay with and move with the upper camera body section 31, while the backing plate 89 is mounted on and stays with the lower camera body section 45, so that the backing plate 89 is fully exposed in an accessible position, and the sensitized material can easily be laid across the backing plate 89 for initial loading of the camera, and threaded around the roller 91. Then when the camera body parts are closed again, the lateral flanges 93 will come down on top of the marginal edges of the film, pressing the film down to the curved shape of the backing plate 89.

The present camera is intended for making pictures by the diffusion transfer process (either silver diffusion or dye diffusion) using sensitized material of a special composite type, having first a base of paper or other suitable sheet material, then a receiving layer coated on the base material, then optionally but not necessarily a stripping layer over the receiving layer, and then a light sensitive negative layer over the stripping layer, if any, or directly over the receiving layer if there is no stripping layer. Each layer is known per se in the art and may be of conventional kind, although the individual layers of known kind have not previously been combined in the same way, nor have they been combined with a treating or processing web in the manner which is done by the present invention.

The processing fluid, according to the present invention, is applied by means of a web of sheet material drawn as needed from a roll 101 in a cylindrical container 103 which is mounted in the lower body section forwardly of the exposure area. The processing web is drawn out of the container 103 as at 105, through an approximately tangential slot 107 which is kept fairly tightly closed by a flexible flange 109 which bears resiliently against the web 105, so as to seal the interior of the container 103 reasonably tightly and prevent evaporation of the processing fluid which is imbibed in the sheet material from which the web is made. The entire thickness of the web of material may be saturated with the processing fluid, or if desired only that face of the web which is to come into contact with the light-sensitive exposed material may be saturated with the processing fluid. But in either event, the web 105 containing the necessary amount of processing fluid is withdrawn as above stated from the container 103, joins the exposed negative face of the print material at the roller 91, and the two sheets together pass between the roller 91 and the pressure roller 111 which is mounted on a pair of swinging arms 113 at opposite sides of the lower section of the camera body, these arms being pivoted at 115 to metal brackets 117 mounted on the inner face of the front wall of the lower section of the camera body. Springs 119 urge the arms 113 in a rearward direction so as to press the roller 111 firmly rearwardly toward the roller 91, thereby pressing two layers of sheet material firmly against each other as the sheet material passes between the nip of the rollers 91 and 111. The two layers are, of course, the layer of sensitized print material drawn from the roll 81 in the cylinder 83, and the layer of processing material drawn from the roll 101 in the cylinder 103.

The shaft of the roller 91 is extended out through the right hand side wall of the lower section of the camera body, in a light tight manner, where it is provided with an external crank handle 121. By turning the crank, to rotate the roller 91, the material is advanced between the two rollers 91 and 111, and is deflected in a rearward direction by the inclined deflecting member 123, so that the advancing edge of the sheet material moves rearwardly through the space between the bottom of the camera and the partition 125 which is spaced above the bottom and which has light tight engagement with the back wall and side walls of the bottom section of the camera body. When a length of the sheet material is fed into this chamber between the bottom wall and the partition 125, it occupies a position such as shown by the broken lines 127. After the required processing interval or re-action interval, which may vary from a few seconds to a minute or more, depending upon the exact nature of the negative layer, receiving layer, and processing fluid, a door 131 in the bottom wall of the bottom section of the camera is opened by releasing the catch or latch 133 and swinging the door downwardly on its hinge 135. This enables access to the strip of material 127, which is then torn off of the rest of the sheet material in the camera by pulling it at an angle against a serrated or toothed edge 137 of the metal deflector 123. The serrated edge 137 projects a little beyond the edge of the door opening formed when the door 131 is open, to provide a sharp toothed edge for contact with the sheet material to tear it across the width thereof.

When the sheet material has been torn off and removed from the camera, the door 131 may be closed again and the camera is now ready for making the next exposure. In fact, the next exposure can be made while the sheet material is in the bottom chamber waiting for the elapse of the processing time, but the exposed material cannot be fed forwardly for processing until the previously exposed material has been torn off and removed.

When the material has been taken out of the camera, the layer or web containing the processing fluid is pulled away from the base sheet of the print. The processing web 101, 105 has greater affinity for the negative layer on the base sheet, than the negative layer has for the receiving layer. Therefore, when the processing layer or web is stripped off of the base sheet, the negative layer will come off with it, thereby exposing to view the receiving layer on the base sheet. This receiving layer will have on it a positive image corresponding to the negative image which was exposed on the negative layer and then transferred through the negative layer (and through the stripping layer, if one is used) to the receiving layer, by the action of the processing fluid applied from the processing web 101, 105, the action of the processing fluid in causing the diffusion transfer being well understood by those skilled in the art of diffusion transfer technology.

Because of the use of the reflecting mirror 73 in the optical path, and because of the fact that the image is transferred through the negative layer of the composite print material to the receiving layer on the back of the negative layer, it follows that the final positive image on the receiving layer of the base material will be a correct or direct reading image, rather than a reversed image.

For measuring the proper length of print material to be fed for processing at the end of each exposure, the composite print sheet is preferably provided with a series of small holes spaced at the proper interval corresponding to the length of the print. A resilient metal claw or stop member 141 is mounted on a short shaft 143 which extends out through the right hand side wall of the lower portion of the camera body and is provided with an external handle 145. This stop member 141 has a bent end which is in line with the row of holes in the print material, and which normally presses against the rear face of the print material so as to engage into one of the holes when the material is fed to bring a hole to the location of the bent end of the member 141. Thus, in operation, the user turns the handle 145 slightly in a counterclockwise direction to turn the shaft 143 so that the bent end of the stop member 141 is removed from the hole in the print material in which it is already seated, and then while momentarily holding the handle 145 in the released position, the user starts to turn the feeding crank 121. As soon as the motion has commenced, the handle 145 may be released. Operation of the feeding crank 121 is then continued until the operator feels the resistance caused by stoppage of movement of the sheet material, when the end of the stop member 141 drops into the next hole in the strip of print material.

When the bottom door 131 is opened to take out a finished print, light is prevented from entering the rest of the camera and fogging the unexposed film by the position 125, which is light tight to the walls of the bottom body section 45 at its side and rear edges. The forward edge of the partition 125 terminates just to the rear of the roller 91 and at approximately the level of the top of the roller, as shown, having a forwardly extending flat flange 146 over which the sensitized material is drawn by rotation of the roller 91. Just above this flat flange 146, the bottom of the cylindrical container 103 carries a strip 147 of plush or long pile textile fabric or similar material which presses resiliently on the top surface of the sensitized sheet 85 so as to form a light trap, if necessary, or if desired the flange 146 itself may be located so close to the bottom of the container 103 that the parts themselves (with the interposed web 85) form their own light trap without the need for any sealing plush or fabric. Thus when the door 131 is open, even if light passes around the bottoms of the rollers 91 and 111 and enters the space in front of and above these rollers, it still cannot pass rearwardly beyond the flange 146 and so cannot fog the unexposed sensitized material. The cylindrical container 103 itself completes the light trap at this point, as it is of opaque material, and when the camera parts are closed the top edge of the container 103 fits tightly in a socket formed by a rearwardly extending overhanging flange 149 molded on the rear of the partition 65, as clearly seen in FIG. 3, preventing light from passing rearwardly at this point. As an additional precaution, there may be a flexible flange 150 mounted on the member 123 and bearing lightly against the face of the web 105 as shown in FIG. 3, throughout the full width thereof, to tend to prevent light from passing forwardly beyond the roller 91 when the door 131 is opened.

Figure 4:
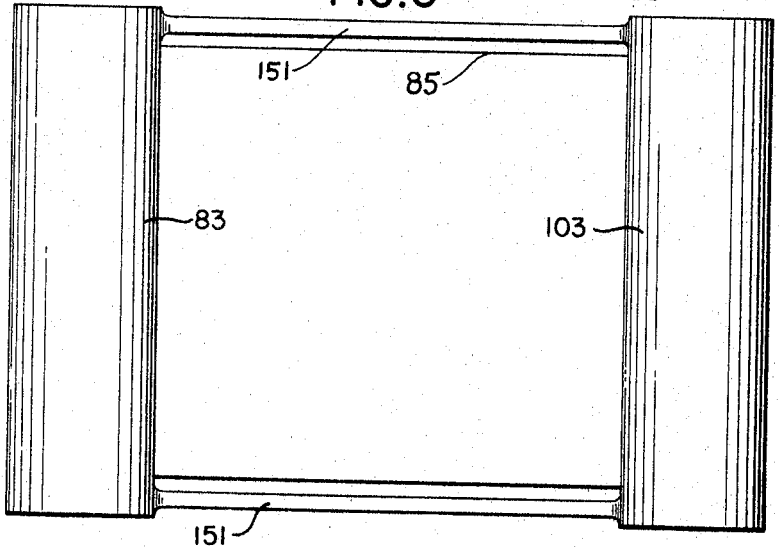
FIG. 4 is a plan of a cartridge containing the print material and the processing material, for use in the camera of FIGS. 1–3.
Figure 5:
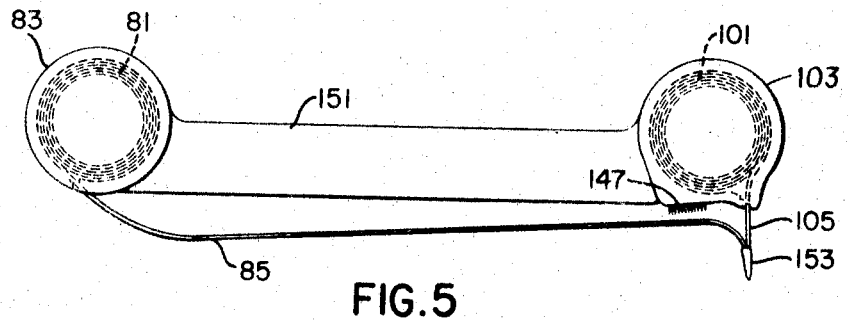
FIG. 5 is a side elevation of the cartridge.

The capsule or container 83 for the sensitized material 81, 85, and the capsule or container 103 for the processing web 101, 105 can be separate elements unconnected to each other, if desired. However, for more convenient loading and unloading of the camera, it is preferred to attach them to each other by webs or flanges 151 connecting them to each other at their ends, that is, at opposite sides of the camera. This is best seen in FIGS. 4 and 5. Thus the two cylinders and the connecting webs together form a capsule or cartridge which may be easily handled and easily loaded into the camera, and removed therefrom when the contents have been used up. Preferably, when the capsule or cartridge is initially supplied to the user, a small part of the length of the processing web 101, 105 projects out from the slot in the portion 103, and a somewhat longer length of the sensitized material 81, 85 projects out from the slot in the capsule portion 83, and the projecting ends of the members 85 and 105 are fastened to each other at 153 (FIG. 5) by adhesive tape or other suitable means. When loading the camera, the upper and lower camera sections are, of course, opened up relative to each other by swinging around the hinge 43, which completely opens up the top of the lower section and allows the capsule or cartridge to be dropped into place, so that the extreme ends of the capsule portions 83 and 103 enter sockets molded in the thickness of the side walls of the bottom section of the camera body. The end 153 of the two webs of material is inserted into nip or bite between the rollers 91 and 111, and the feeding crank 121 is turned a slight amount, just enough to be sure that the end 153 is properly caught between the rollers. Then the camera body is closed again, so that the flange 149 comes down on top of the capsule portion 103 and holds it firmly in its seat, and another flange or boss 155 comes down on the other capsule portion 83 and holds it firmly in its seat while the camera is closed.

Then the operator winds the crank 121 until he feels the feeding motion stop because of the engagement of the stop member 141 in the first hole in the sensitized print material. The camera is now ready for the first exposure, which is accomplished by downward pressure on the external shutter trigger or release member 69, with or without a previous setting motion of the shutter, depending upon the particular type of shutter employed, which is no important for purposes of the present invention.

After the exposure has been made, the film is released by motion of the release handle 145 and another feeding motion is performed by turning the crank 121 until it is again stopped by engagement of the member 141 with the next hole in the sensitized print material. During this feeding motion following the first exposure, a suitable length of the processing web 101, 105 has been drawn out of the chamber 103, and fed along with the exposed portion of the sensitized print web 85, and has been pressed against it firmly where the two webs pass together through the nip or bite of the rollers 91, 111, so that the processing fluid absorbed or imbibed in the web 105 has been applied to the adjacent negative layer on the print web, and reacts with the negative layer on the print web while the two webs lie together in contact with each other, in the position 127 in the processing chamber below the partition 125. During the required short interval from a few seconds to a minute or more, the processing fluid reacts with the negative layer to cause a transfer from the rear face of the negative layer to the receiving layer coated on the base sheet or support, in a manner well understood in the diffusion transfer process. Then after the required interval, the door 131 is opened as already briefly mentioned above, the processed web 127 is pulled out and torn off against the sharp serrated edge 137, the processing web is pulled away from the base sheet stripping the negative layer off with it, leaving the base sheet with the postive image thereon, to constitute the final usable print.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera adapted for taking pictures while held in the hand and comprising means for holding a portion of a web of sensitized sheet material in exposure position within an exposure area, a first substantially light tight container beyond one edge of said area for containing a rolled web of sensitized sheet material in position so that successive portions thereof may be withdrawn from said first container and moved to said exposure area, a second container beyond the opposite edge of said area for containing a rolled web of processing sheet material imbibed with processing fluid, in position so that successive portions thereof may be withdrawn from said second container and moved into contact with an exposed portion of the sensitized material, said second container enclosing said rolled web of processing sheet material in a sufficiently moisture-tight manner to impede detrimental evaporation of the processing fluid imbibed in the processing sheet material during a normal life interval, a pair of struts spaced from each other on opposite sides of said exposure area and rigidly connecting said two containers to each other for handling as a unit when inserting them in and removing them from said camera, and means for pressing an advancing portion of said processing sheet material into contact with a portion of said sensitized sheet material as the latter is advanced from said exposure position toward a processing position, so that processing fluid imbibed in said processing sheet material may react with the exposed sensitized sheet material in contact therewith.

2. A construction as defined in claim 1, in which said sensitized sheet material includes a support, a receiving layer coated over the support, a negative light-sensitive layer coated over the receiving layer, and a stripping layer interposed between the receiving layer and the negative layer to facilitate stripping the negative layer from the receiving layer while leaving the receiving layer on the support, and further including reflecting means interposed in the path of light passing toward said exposure area to reverse the image falling on the front face of said negative layer so that, upon diffusion through said negative layer to said receiving layer, a direct reading print will result.

3. A light, portable photographic apparatus for taking and quickly processing an image to produce a usable photographic print, said apparatus comprising a light-tight camera body formed by a main body section having a generally open lower side and a hinged cover section hinged to said main body section and mating with said open lower side to form a light-tight chamber in said camera body, lens means in said main body section for projecting light along a first optical axis, reflecting means in said main body section for intersecting said first optical axis and for reflecting light passing along said first optical axis toward the open lower side of said main body section, flange and plate means on said main body section adjacent said lower side and on said cover section defining an exposure area, and a pair of parallel rollers firmly biased toward each other, one said roller supported by each said section of said camera body and extending transversely of said flange and plate means, a roll of layered light-sensitized photographic print developable sheet material having a portion withdrawn therefrom and supported by said flange and plate means and positioned between said rollers, first removable, substantially light-tight container means in said main body section to support said roll on one side of said exposure area, a roll of nonsensitized, processing fluid-imbibed sheet material, sealed second removable container means for supporting said roll of processing material adjacent the other side of said exposure area with a portion of said processing material withdrawn from the roll and contacting the sensitized material between said rollers, connection means rigidly connecting together said first and second removable container means and providing thereby a removable photographic package unit, said rollers firmly pressing said sheet material from each said roll into intimate face to face contact in the area between said rollers, drive means for one of said rollers for rotating said roller and withdrawing said sheet material from each said roll to successively position unexposed sensitized sheet material in said exposure area and position exposed portions in contact with said processing sheet material to afford development of the former by contact with fluid imbibed in the latter.

4. The apparatus as defined in claim 3 wherein said cover section has partition means forming a reaction chamber, separate and light-tight from said chamber in said camera body, into which the laminate of said exposed sensitized sheet material and said processing sheet material is fed from said rollers to afford a processing interval before removal of the laminate from the camera body.

5. The apparatus as defined in claim 4 wherein said cover section has door means affording access to said reaction chamber for removal of said laminate without admitting light to said light-tight chamber.

6. Diffusion transfer process photographic apparatus for taking and quickly processing an image of a scene to produce a usable photographic print, said apparatus comprising a light-tight camera body formed by a main body section and having a generally open side and a cover section hinged to said main body section and mating with said open side to form a light-tight chamber in said camera body, optical means in said main body section for passing scene light toward said side of said main body section, flange and plate means on said main body section adjacent said side defining an exposure area, a pair of parallel rollers firmly biased toward each other, one said roller supported by each said section of said camera body and extending transversely of said flange and plate means, a roll of layered, light sensitized photographic print developable sheet material having a portion withdrawn therefrom and supported by said flange and plate means and positioned between said rollers, first removable substantially light-tight container means in said main body section to support said roll on one side of said exposure area, a roll of processing web, sealed second removable container means for supporting said roll of processing web adjacent the other side of said exposure area with a portion of said processing web withdrawn from the roll and contacting sheet material between said rollers, connection means rigidly connecting together said first and second removable container means, said first and second removable container means and said connection means forming an integral package insertable in and removable from said body as a unit, said rollers firmly pressing the sheet material and web between said rollers into intimate face to face contact, drive means for one of said rollers for rotating said roller and withdrawing said sheet material and processing web from said rolls thereof to position unexposed sensitized sheet material successively in said exposure area and position exposed portions in contact with said processing web to effect development of the former.

References Cited by the Examiner

UNITED STATES PATENTS

| | | | |
|---|---|---|---|
| 2,708,864 | 5/1955 | Land | 95—89 |
| 2,794,378 | 6/1957 | Wareham | 95—13 |
| 2,854,903 | 10/1958 | Land | 95—13 X |
| 2,972,532 | 2/1961 | Land | 96—29 |
| 3,041,952 | 7/1962 | Schreck | 95—14 |
| 3,120,792 | 2/1964 | Erikson | 95—13 |
| 3,134,317 | 5/1964 | Land | 95—89 |

JOHN M. HORAN, *Primary Examiner.*